(12) United States Patent
Xie et al.

(10) Patent No.: US 12,089,570 B2
(45) Date of Patent: Sep. 17, 2024

(54) HIGH-DENSITY KEEPING-ALIVE BOX FOR FISH AND TRANSPORT METHOD USING SAME

(71) Applicant: Shanghai Ocean University, Shanghai (CN)

(72) Inventors: Jing Xie, Shanghai (CN); Qi Wang, Shanghai (CN); Jinfeng Wang, Shanghai (CN); Fatong Jia, Shanghai (CN); Jun Mei, Shanghai (CN); Yuting Ding, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 83 days.

(21) Appl. No.: 17/983,526

(22) Filed: Nov. 9, 2022

(65) Prior Publication Data
US 2023/0061091 A1    Mar. 2, 2023

(51) Int. Cl.
*A01K 63/02* (2006.01)
*A01K 63/04* (2006.01)

(52) U.S. Cl.
CPC .............. *A01K 63/02* (2013.01); *A01K 63/04* (2013.01)

(58) Field of Classification Search
CPC ...... A01K 63/02; A01K 63/04; A01K 63/042; A01K 63/045; A01K 63/047
USPC ......................................................... 119/203
See application file for complete search history.

(56) References Cited

U.S. PATENT DOCUMENTS

| | | | |
|---|---|---|---|
| 5,012,763 A * | 5/1991 | Morrison | A01K 1/0236 119/302 |
| 7,523,718 B2 * | 4/2009 | Torring | A01K 63/02 119/203 |
| 2008/0010894 A1 * | 1/2008 | Stafford | A01K 63/042 43/57 |
| 2011/0162585 A1 * | 7/2011 | Tominaga | A01K 63/045 119/264 |
| 2020/0404889 A1 * | 12/2020 | Perslow | A01K 63/042 |

FOREIGN PATENT DOCUMENTS

| | | | |
|---|---|---|---|
| CN | 105475212 A | | 4/2016 |
| CN | 106746210 A | * | 5/2017 |
| CN | 208338676 U | | 1/2019 |
| CN | 114532256 A | * | 5/2022 |
| KR | 102237734 B1 | * | 4/2021 |

* cited by examiner

*Primary Examiner* — Tien Q Dinh
*Assistant Examiner* — Erica Michelle Huebner

(57) ABSTRACT

A high-density keeping-alive box for fish and a transport method using same. The keeping-alive box includes a box body and a cover assembly. The box body includes a fish accommodating area and a water circulation area. A cover of the cover assembly on the fish accommodating area is pivotedly connected to the box body, and is provided with a vent hole to prevent splash. A connection between the cover assembly and the box body is provided with a splash-proof rubber. The water circulation area is arranged at a side inside the box body. The water circulation area includes a purification system, a refrigerator and an aeration system arranged sequentially. The purification system includes a primary filtration area, a secondary filtration area, an activated carbon filtration area and an ultraviolet (UV) sterilization area.

1 Claim, 4 Drawing Sheets

HIGH-DENSITY KEEPING-ALIVE BOX FOR FISH AND TRANSPORT METHOD USING SAME

TECHNICAL FIELD

This application relates to live transportation of fish, and more particularity to a high-density keeping-alive box for fish and a transport method using same.

BACKGROUND

During the long-distance transportation, the fish is generally placed in a polyethylene (PE) bag with a certain volume of water, and then the PE bag is fed with oxygen, tied up, and placed into a foam box or a thermal insulation box with ice for transportation.

Regarding the above transportation method, the direct contact between the fish and the ice will make the fish prone to getting injured, and the ice is prone to melting, failing to enable the long-term cooling. In addition, during the live transportation, with the consumption of oxygen, the dissolved oxygen level will be too low to keep the fish alive. Furthermore, in the absence of water circulation and filtration, the water quality will get worse and worse with the accumulation of toxic and harmful substances (such as ammonia nitrogen and nitrite, and other acidic compounds which will cause pH decline) in the water, threatening the survival of fish.

SUMMARY

An object of this application is to provide a high-density keeping-alive box for long-distance transportation of fish, which can maintain the dissolved oxygen at a desired level and a low temperature environment for a prolonged period, and effectively improve the water quality. A transport method using the above box is also provided herein.

Technical solutions of this application are described as follows.

In a first aspect, the present disclosure provides a keeping-alive box for fish, comprising:
  a box body; and
  a cover assembly;
  wherein a top of the box body is provided with an opening; and the cover assembly is arranged at the opening to allow the box body being opened or closed;
  the box body comprises a fish accommodating area and a water circulation area; and the water circulation area is arranged at a side inside the box body;
  the cover assembly comprises a first cover and a second cover; the first cover is arranged at the opening corresponding to the fish accommodating area, and is pivotedly connected to the box body; and the first cover is provided with a vent hole to prevent splash;
  the second cover is arranged at the opening corresponding to the water circulation area;
  a connection between the cover assembly and the box body is provided with a splash-proof rubber;
  the water circulation area comprises a purification system, a refrigerator and an aeration system arranged sequentially; the aeration system is partially arranged inside the fish accommodating area; the fish accommodating area is communicated with the purification system; the purification system is communicated with the refrigerator; the refrigerator is communicated with the fish accommodating area, such that water in the fish accommodating area is allowed to sequentially passed through the purification system and the refrigerator, and then flow back to the fish accommodating area; the purification system is configured to purify water passing from the fish accommodating area to the water circulation area; the refrigerator is configured to cool the water passing from the fish accommodating area to the water circulation area to a desired temperature and maintain it; and the aeration system is configured to maintain a dissolved oxygen in the water in the fish accommodating area at a desired level;
  the purification system comprises a primary filtration area, a secondary filtration area, an activated carbon filtration area and an ultraviolet (UV) sterilization area arranged sequentially; the primary filtration area is communicated with the fish accommodating area; the UV sterilization area is communicated with the refrigerator; and the water in the fish accommodating area is allowed to sequentially flow through the primary filtration area, the secondary filtration area, the activated carbon filtration area and the UV sterilization area to enter the refrigerator;
  a first hollowed-out baffle is provided between the primary filtration area and the fish accommodating area;
  the primary filtration area is provided with an irregular porous filter sieve and a porous sponge;
  a second hollowed-out baffle is provided between the primary filtration area and the secondary filtration area;
  the secondary filtration area is provided with a filter cotton;
  a third hollowed-out baffle is provided between the secondary filtration area and the activated carbon filtration area;
  the activated carbon filtration area is provided with activated carbon particles;
  a fourth hollowed-out baffle is provided between the activated carbon filtration area and the UV sterilization area;
  the UV sterilization area is provided with a UV lamp configured for sterilization;
  the refrigerator is provided with a water inlet and a water outlet; the water outlet of the refrigerator is connected to a water outlet of the box body; and
  the aeration system comprises an aeration device and an aerator; the aeration device is hermetically connected to the aerator; the aerator is located in the water circulation area; the aeration device is located in the fish accommodating area; the aerator is configured to supply power to the aeration device; the aeration device is configured to perform aeration in the water of the fish accommodating area to maintain the dissolved oxygen in the fish accommodating area at the desired level; the fish accommodating area further comprises a dry area inside; the refrigerator and the aerator are located in the dry area; and the dry area is communicated with the outside through an air discharge hole.

The keeping-alive box provided herein can effectively alleviate the deterioration of water quality, improving the survival rate.

In some embodiments, the box body and the cover assembly are both made of PE.

In some embodiments, a solid baffle is provided between the UV sterilization area and the dry area; a drain hole is provided at a lower portion of the solid baffle; the UV sterilization area is further provided with a water pump; the water pump is connected to the water inlet of the refrigerator through the drain hole; the water pump is configured to supply power for water circulation between the purification system, the refrigerator and the fish accommodating area.

In some embodiments, the water outlet of the refrigerator is connected to a water outlet of the box body; and the water outlet of the box body is communicated with the fish accommodating area.

In some embodiments, the aeration device is provided with a plurality of aeration holes; and the aeration device is configured to perform aeration in the water of the fish accommodating area through the plurality of aeration holes, so as to maintain the dissolved oxygen at the desired level.

In a second aspect, the present disclosure provides a transport method for fish using the above-mentioned keeping-alive box, comprising:

(S1) 36 h before transportation, subjecting fish to temporary culture in water with a temperature of 20-22° C., a salinity of 16‰, a dissolved oxygen level of 4-6 mg/L, and a pH of 7.5-8.5, wherein a volume ratio of the fish to the water is 1:50;

(S2) adding an emulsified *Melissa officinalis* essential oil into water in the keeping-alive box, wherein the emulsified *Melissa officinalis* essential oil is prepared through a step of:

evenly mixing *Melissa officinalis* essential oil with a concentration of 40 mg/L, ethyl alcohol with a volume fraction of 50% and tween-80 in a volume ratio of 10:200:1;

(S3) transferring the fish to the keeping-alive box, wherein a volume ratio of the fish to the water in the keeping-alive box is 1:4; and cooling, by the refrigerator, the water in the keeping-alive box from 20-22° C. to 12° C. at a rate of 3° C./h;

(S4) covering the box body with the cover assembly followed by transportation for 72 h; wherein during the transportation, a water temperature is controlled to 12° C.±1° C.; and (S5) transferring the fish to clean water with a temperature of 12° C.±1° C. followed by restoration to room temperature.

Compared to the prior art, this application has the following beneficial effects.

The transport method provided herein can effectively alleviate the atrophy and deformation of gill filaments, reduce levels of hydrocortisone, stress protein, glucose and Caspase-3, and raise levels of lysozyme and immunoglobulin, such that the oxidative stress reaction occurring during transportation can be relieved, improving the survival rate.

Figure 1:
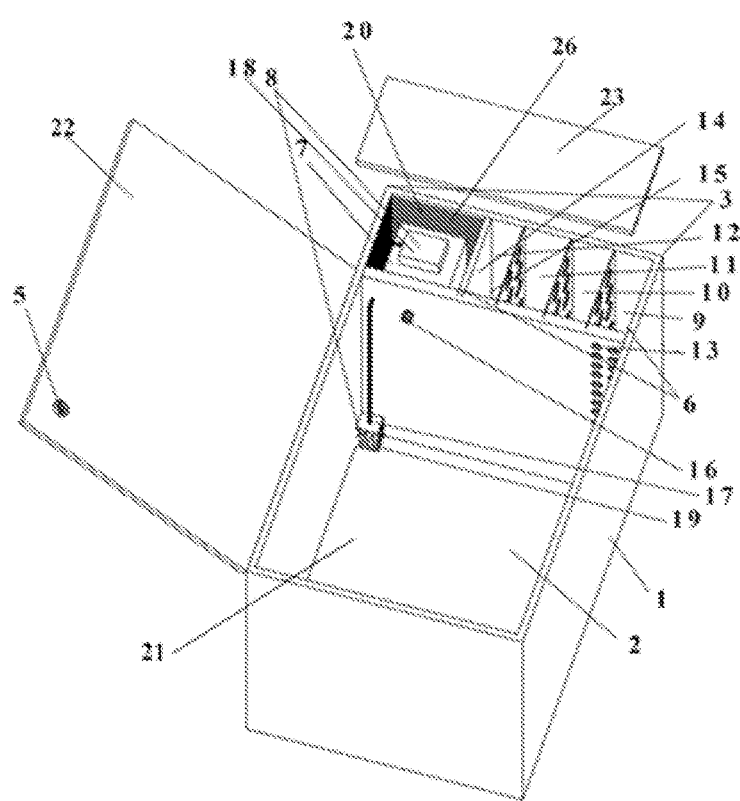
FIG. 1 schematically depicts a structure of a high-density keeping-alive box for fish according to an embodiment of the present disclosure.

In the drawings, 1, box body; 2, fish accommodating area; 3, water circulation area; 4, cover assembly; 5, vent hole; 6, purification system; 7, refrigerator; 8, aeration system; 9, primary filtration area; 10, secondary filtration area; 11, activated carbon filtration area; 12, UV sterilization area; 13, first hollowed-out baffle; 14, solid baffle; 15, drain hole; 16, second water outlet; 17, aeration device; 18, aerator; 19, aeration hole; 20, air discharge hole; 21, opening; 22, first cover; 23, second cover; 24, water inlet; 25, first water outlet; 26, dry area; 27, water pump; 28, porous filter sieve; 29, porous sponge; 30, filter cotton; 31, filter cotton; 32, UV lamp; 33, second hollowed-out baffle; 34, third hollowed-out baffle; 35, fourth hollowed-out baffle; and 36, through hole.

DETAILED DESCRIPTION OF EMBODIMENTS

Technical solutions of the present disclosure will be clearly and completely described below with reference to the embodiments and accompanying drawings.

Figure 2:
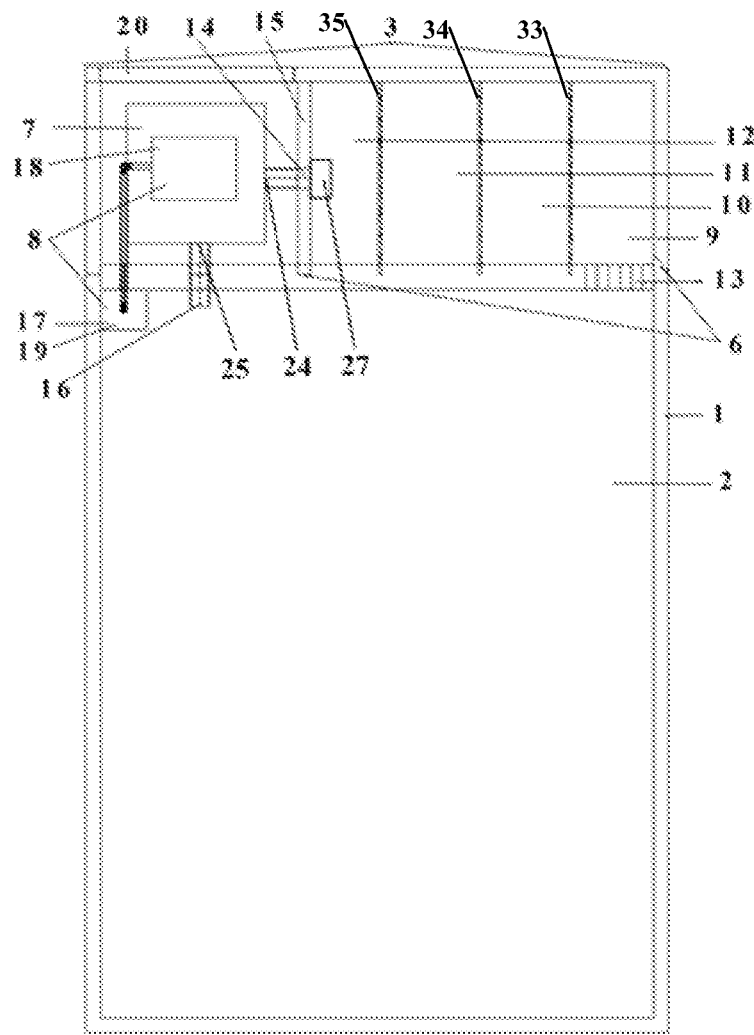
FIG. 2 is a top view of the high-density keeping-alive box according to an embodiment of the present disclosure.
Figure 3:
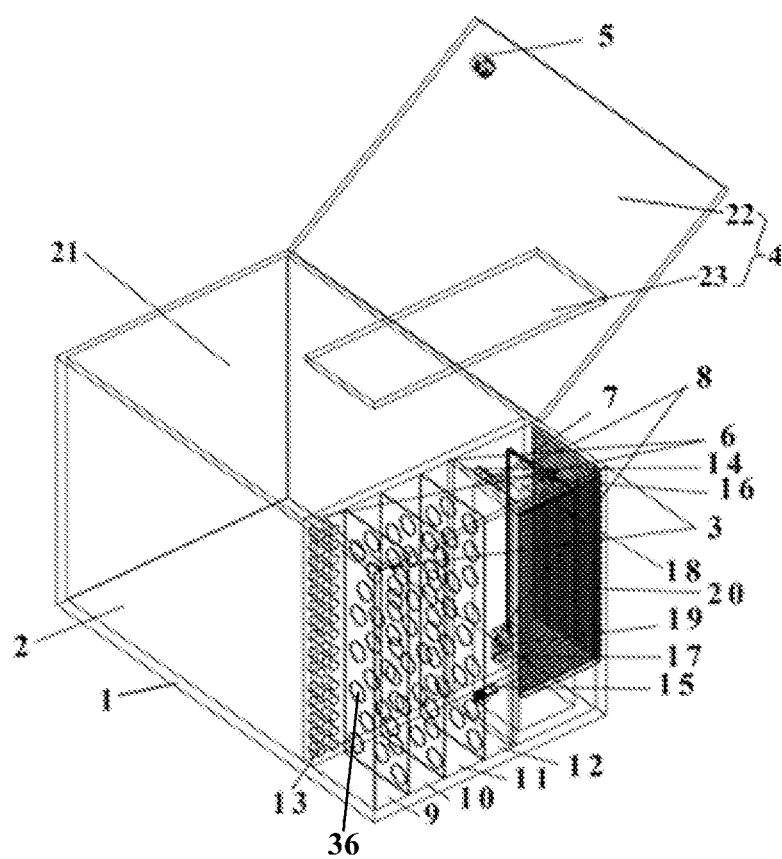
FIG. 3 is a perspective view of the high-density keeping-alive box according to an embodiment of the present disclosure.

Referring to an embodiment illustrated in FIGS. 1-3, a high-density keeping-alive box for fish is illustrated.

The keeping-alive box includes a box body 1 and a cover assembly 4. The box body 1 includes a fish accommodating area 2 and a water circulation area 3. The fish accommodating area 2 is configured to accommodate fish and water. A top of the box body 1 is provided with an opening 21. The cover assembly 4 is arranged at the opening 21 to allow the box body 1 being opened or closed, so as to prevent water spilling during the transportation. The cover assembly includes a first cover 22 and a second cover 23. The first cover 22 is arranged at the opening 21 corresponding to the fish accommodating area 2, and is pivotely connected to the box body 1. The second cover 23 is arranged at the opening 21 corresponding to the water circulation area 3. A connection between the cover assembly 4 and the box body 1 is provided with a splash-proof rubber. The box body 1 and the cover assembly 4 are both made of eco-friendly PE. Since the gas in the box body is prone to expansion during the aerated transportation, the first cover 22 is provided with a vent hole 5 to prevent splash.

Referring to FIGS. 1-2, the water circulation area 3 is arranged at a side inside the box body 1. In order to maintain the dissolved oxygen at a desired level and a low temperature environment, and to effectively purify the water, the water circulation area 3 includes a purification system 6, a refrigerator 7 and an aeration system 8 arranged sequentially. The aeration system 8 is partially arranged in the fish accommodating area 2. The fish accommodating area 2 is communicated with the purification system 6. The purification system 6 is communicated with the refrigerator 7. The refrigerator 7 is communicated with the fish accommodating area 2. Water in the fish accommodating area 2 sequentially passes through the purification system 6 and the refrigerator 7, and then flows back to the fish accommodating area 2. The purification system 6 is configured to purify water passing from the fish accommodating area 2 to the water circulation area 3. The refrigerator 7 is configured to cool water passing from the fish accommodating area 2 to the water circulation area 3 to a desired temperature and maintain it. The aeration system 8 is configured to maintain the dissolved oxygen in the water in the fish accommodating area 2 at the desired level.

Referring to FIG. 2, the purification system 6 includes a primary filtration area 9, a secondary filtration area 10, an activated carbon filtration area 11 and a UV sterilization area 12 arranged sequentially. The primary filtration area 9 is communicated with the fish accommodating area 2. The UV sterilization area 12 is communicated with the refrigerator 7. The water in the fish accommodating area 2 sequentially flows through the primary filtration area 9, the secondary filtration area 10, the activated carbon filtration area 11 and the UV sterilization area 12 to enter the refrigerator 7.

Figure 4:
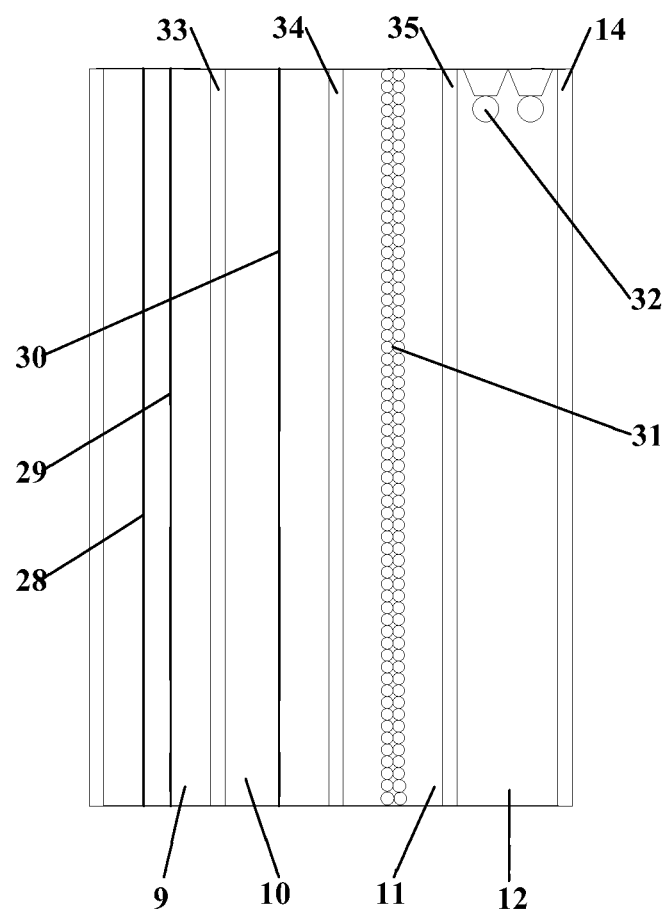
FIG. 4 is a side view of a purification system according to an embodiment of the present disclosure.

Referring to FIGS. 2-4, a first hollowed-out baffle 13 is provided between the primary filtration area 9 and the fish accommodating area 2. A second hollowed-out baffle 33 is provided between the primary filtration area 9 and the secondary filtration area 10. The primary filtration area 9 is provided an irregular porous filter sieve 28 and a porous sponge 29. The porous filter sieve 28 is made of PE. A third hollowed-out baffle 34 is provided between the secondary filtration area 10 and the activated carbon filtration area 11. The secondary filtration area 10 is provided with a filter cotton 30. A fourth hollowed-out baffle 35 is provided between the activated carbon filtration area 11 and the UV sterilization area 12. The activated carbon filtration area 11 is provided with activated carbon particles 31. A solid baffle 14 is provided between the UV sterilization area 12 and the refrigerator 7. A drain hole 15 is provided at a lower portion of the solid baffle 14. The UV sterilization area is provided with a water pump 27. The water pump 27 is connected to the refrigerator 7 through the drain hole. The water pump 27 is configured to supply power for water circulation between the purification system 6, the refrigerator 7 and the fish accommodating area 2. The UV sterilization area 12 is further provided with a UV lamp 32 configured for sterilization. Water in the fish accommodating area 2 passes through the first hollowed-out baffle 13 to enter the primary filtration area 9, and then is filtered by the irregular porous filter sieve 28 and the porous sponge 29 to remove large particles. Then, the water passes through the second hollowed-out baffle 33 to enter the secondary filtration area 10, and is filtered by a filter cotton 30 to remove small particles. After that, the water passes through the third hollowed-out baffle 34 to enter the activated carbon filtration area 11, where the activated carbon particles in the activated carbon filtration area 11 can adsorb harmful substances in the water such as organic macromolecules and residual chlorine. After treated by the activated carbon, the water passes through the fourth hollowed-out baffle 35 to enter the UV sterilization area 12, in which the UV lamp 32 is configured for sterilization. The first hollowed-out baffle 13, the second hollowed-out baffle 33, the third hollowed-out baffle 34 and the fourth hollowed-out baffle 35 are provided with multiple through holes 36 to allow water to pass, such that the water can pass through the first hollowed-out baffle 13, that the second hollowed-out baffle 33, the third hollowed-out baffle 34 and the fourth hollowed-out baffle 35.

Referring to FIG. 2, the refrigerator 7 is provided with a water inlet 24 and a first water outlet 25. The water inlet 24 of the refrigerator 7 is communicated with the UV sterilization area 12. The first water outlet 25 of the refrigerator 7 is communicated with the fish accommodating area 2. Specifically, the first water outlet 25 of the refrigerator 7 is connected to a second water outlet 16 of the box body 1. The second water outlet 16 is communicated with the fish accommodating area 2. In consequence, a refrigeration-filtration integrating water circulation is achieved.

Referring to FIG. 2, the aeration system 8 includes an aeration device 17 and an aerator 18. The aeration device 17 is hermetically connected to the aerator 18. The aerator 18 is located in the water circulation area 3. The aeration device 17 is located in the fish accommodating area 2. The aerator 18 is configured to supply power to the aeration device 17. The aeration device 17 is provided with a plurality of aeration holes 19 to allow the aeration device 17 to perform aeration in the water of the fish accommodating area 2, such that the dissolved oxygen in the fish accommodating area 2 can be maintained at a desired level.

Referring to FIGS. 1-2, the fish accommodating area 2 further includes a dry area 26 inside. The refrigerator 7 and the aerator 18 are located in the dry area. The dry area is communicated with the outside through an air discharge hole 20. Specifically, the refrigerator 7 and the aerator 18 are configured to transfer outside air containing oxygen to the water in the fish accommodating area 2 through the air discharge hole 20. The refrigerator 7 and the aerator 18 are powered by 220 V alternating voltage. The keeping-alive box provided herein can effectively alleviate the deterioration of water quality and relief stress reaction during transportation, improving the survival rate.

Described is a transport method for branzino using the above-mentioned keeping-alive box.

The keeping-alive box is washed and injected with water. An emulsified *Melissa officinalis* essential oil with a concentration of 40 mg/L is added into the water. *Lateolabrax japonicas* is transferred to the keeping-alive box, where the branzino has been raised for 36 h before transportation. The refrigerator cools the water in the keeping-alive box from 20-22° C. to 12° C. at a rate of 3° C./h. Then, the box body is covered with the cover assembly. During the transportation, the water temperature is controlled to 12° C.±1° C.; the salinity is 16‰; the dissolved oxygen level is 4-6 mg/L; the pH is 7.5-8.5; and a volume ratio of the *Lateolabrax japonicas* to the water is 1:4. After 72 h of the transportation, the *Lateolabrax japonicas* is then transferred to clean water with temperature of 12±1° C. and restored to room temperature. A survival rate after 72 h of transportation is 96%, and the survival rate after 12 h of restoration is still maintained at 96%. After 72 h of the transportation, the dissolved oxygen level and survival rate using the transport method provided herein are twice those of the normal oxygenating transportation. The observation of gill tissue microstructure (by means of optical microscope and scanning electron microscope) and the measurement of oxidative stress reaction indicators (such as hydrocortisone, stress protein, glucose and Caspase-3) and the immunity test (lysozyme and immunoglobulin) indicate that the *Melissa officinalis* essential oil can alleviate the atrophy and deformation of gill filaments, relieve the oxidative stress reaction and improve immunity.

Compared to the prior art, the transport method provided herein has the following beneficial effects.

During transportation, the stress reaction and tissue damage are effectively relieved, such that the immunity and survival rate of fish are improved. The low-temperature transportation with water circulation filtration and aeration contributes to maintain the dissolved oxygen at a desired level. By means of the *Melissa officinalis* essential oil, the respiratory metabolism of fishes is effectively slowed, such that the anti-stress reaction capacity and immunity are enhanced, leading to a calming and stress-relieving effect. The metabolic wastes excreted by the fish can be stepwise filtered and sterilized by the purification system, effectively reducing levels of harmful bacteria and ammonia nitrogen, and ensuring desired water quality during the whole transportation. Regarding the transport method provided herein, suitable conditions and processes are created for live transportation of fish, improving the survival rate.

Described above are merely illustrative of the disclosure, and are not intended to limit the disclosure. Although the disclosure has been illustrated and described in detail above, it should be understood that those skilled in the art could still make modifications and changes to the embodiments of the disclosure. Those modifications and changes made of those skilled in the art based on the content disclosed herein without departing from the scope of the disclosure shall fall within the scope of the present disclosure defined by the appended claims.

What is claimed is:

1. A transport method for fish using a keeping-alive box, the keeping-alive box comprising:
a box body; and
a cover assembly;
wherein a top of the box body is provided with an opening; and the cover assembly is arranged at the opening to allow opening or closing of the box body;
the box body comprises a fish accommodating area and a water circulation area; and the water circulation area is arranged at a side inside the box body;
the cover assembly comprises a first cover and a second cover; the first cover is arranged at the opening corresponding to the fish accommodating area, and is pivotedly connected to the box body; and the first cover is provided with a vent hole to prevent splash;
the second cover is arranged at the opening corresponding to the water circulation area;
a connection between the cover assembly and the box body is provided with a splash-proof rubber;
the water circulation area comprises a purification system, a refrigerator and an aeration system; part of the aeration system is arranged in the water circulation area, and the other part of the aeration system is arranged in the fish accommodating area; the fish accommodating area is communicated with the purification system; the purification system is communicated with the refrigerator; the refrigerator is communicated with the fish accommodating area, such that water in the fish accommodating area is allowed to sequentially pass through the purification system and the refrigerator, and then flow back to the fish accommodating area; the purification system is configured to purify water passing from the fish accommodating area to the water circulation area; the refrigerator is configured to cool the water passing from the fish accommodating area to the water circulation area to a desired temperature and maintain it; and the aeration system is configured to maintain a dissolved oxygen in the water in the fish accommodating area at a desired level;
the purification system comprises a primary filtration area, a secondary filtration area, an activated carbon filtration area and an ultraviolet (UV) sterilization area arranged sequentially; the primary filtration area is communicated with the fish accommodating area; the UV sterilization area is communicated with the refrigerator; and the water in the fish accommodating area is allowed to sequentially flow through the primary filtration area, the secondary filtration area, the activated carbon filtration area and the UV sterilization area to enter the refrigerator;
the refrigerator is provided with a water inlet and a water outlet; the water inlet of the refrigerator is communicated with the UV sterilization area; and the water outlet of the refrigerator is communicated with the fish accommodating area; and
the aeration system comprises an aeration device and an aerator; the aeration device is hermetically connected to the aerator; the aerator is located in the water circulation area; the aeration device is located in the fish accommodating area; the aerator is configured to supply power to the aeration device; the aeration device is configured to perform aeration in the water of the fish accommodating area to maintain the dissolved oxygen in the fish accommodating area at the desired level; the water circulation area further comprises a dry area inside; the refrigerator and the aerator are located in the dry area; and the dry area is communicated with the outside through an air discharge hole;
the method comprising:
(S1) 36 h before transportation, subjecting fish to temporary culture in water with a temperature of 20-22° C., a salinity of 16‰, a dissolved oxygen level of 4-6 mg/L, and a pH of 7.5-8.5, wherein a volume ratio of the fish to the water is 1:50;
(S2) adding an emulsified *Melissa officinalis* essential oil into water in the keeping-alive box, wherein the emulsified *Melissa officinalis* essential oil is prepared through a step of:
evenly mixing *Melissa officinalis* essential oil with a concentration of 40 mg/L, ethyl alcohol with a volume fraction of 50% and polysorbate 80 in a volume ratio of 10:200:1;
(S3) transferring the fish to the keeping-alive box, wherein a volume ratio of the fish to the water in the keeping-alive box is 1:4; and cooling, by the refrigerator, the water in the keeping-alive box from 20-22° C. to 12° C. at a rate of 3° C./h;
(S4) covering the box body with the cover assembly followed by transportation for 72 h; wherein during the transportation, a water temperature is controlled to 12° C.±1° C.; and
(S5) transferring the fish to clean water with a temperature of 12° C.±1° C. followed by restoration to room temperature.

* * * * *